E. AINSWORTH.
Belt-Clamps.

No. 143,604.

Patented Oct. 14, 1873.

Witnesses:

Inventor:
E. Ainsworth
Per Attorneys.

UNITED STATES PATENT OFFICE.

ELEAZER AINSWORTH, OF WILMINGTON, DELAWARE.

IMPROVEMENT IN BELT-CLAMPS.

Specification forming part of Letters Patent No. 143,604, dated October 14, 1873; application filed July 26, 1873.

*To all whom it may concern:*

Figure 1:
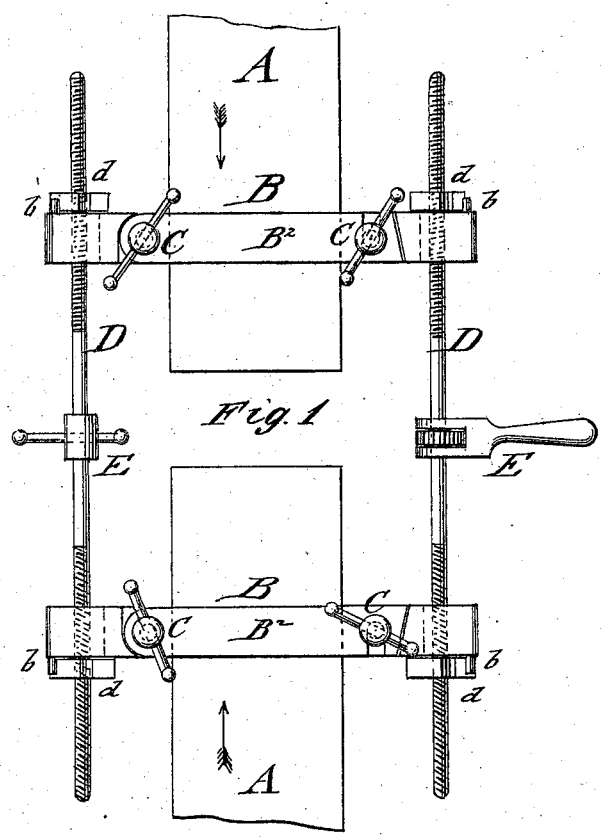
Figure 2:
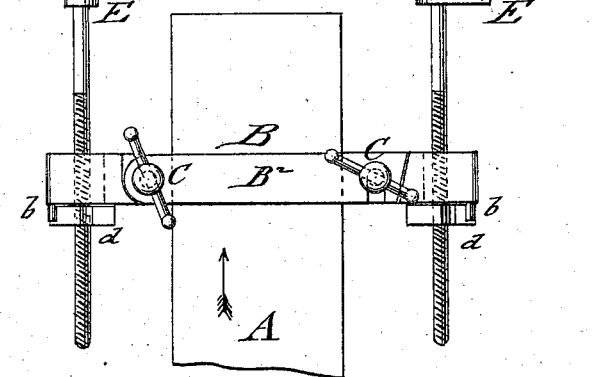

Be it known that I, ELEAZER AINSWORTH, of Wilmington, in the county of New Castle and State of Delaware, have invented a new and Improved Belt-Clamp, of which the following is a specification:

In the accompanying drawing, Figure 1 represents a top view of my improved belt-clamp as applied to the belt to tighten the same; Fig. 2, an end view of the same; and Fig. 3, a detail vertical section through the clamp to show the manner of griping the belt.

Similar letters of reference indicate corresponding parts.

The object of my invention is to construct an improved belt-clamp for drawing the ends of the belt together, and tightening the same, for lacing and other purposes. My invention consists in the construction of the clamps, which are applied to the ends of the belt to be joined, and in the combination with said clamps of right and left adjusting screw-rods and nuts and stop-pins or lugs, as hereinafter set forth.

Figure 3:
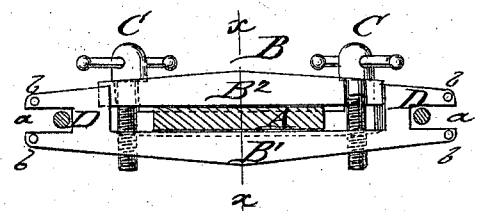

In the drawing, A represents the belt of leather, rubber, or other suitable material, to the ends of which the clamps B are firmly attached. Each clamp, B, consists of the lower base piece $B^1$ and the top piece $B^2$, which are connected by suitable thumb-screws C. Both pieces, B and $B^1$, are grooved at their inner sides, taking hold of the belt-like jaws, as indicated in Fig. 3, to prevent its slipping. Piece $B^2$ is rounded off at one side and straight at the other, so that it may be swung open on one screw, C, and be quickly attached to the belt. The hole for the other thumb-screw, C, in piece $B^2$, is slotted for opening and closing the same on the belt. The ends of piece $B^1$ are provided with recesses $a$, and at their outer edges at the off side of the belt ends with lugs $b$. Rods D extend longitudinally in recesses $a$, and connect clamps B, having right and left hand screw-threads, with nuts $d$ working thereon. A pin or ratchet, E, is placed centrally on rods D between the clamps B, for turning rods D. After the clamps B are applied, the rods D connect them, as the lugs $b$ serve to retain the nuts $d$ in fixed position on clamps B. Each turn of the ratchet or pin E produces then the gradual approach of clamps B and, consequently, the tightening of the belt A, for lacing, &c.

The whole belt-clamp may be made of wood, iron, or other suitable material, and accomplishes the purpose in a rapid and efficient manner.

Having thus described my invention, I claim as new and desire to secure by Letters Patent—

1. The combination, with clamps B having stop-pins $b$, of the right and left hand threaded rods D and nuts $d$, as shown and described, to operate as specified.

2. The clamp B, consisting of base piece $B^1$, with end recesses $a$ and lugs $b$, top piece $B^2$ having slotted hole for opening and closing, and thumb-screws C for attaching them to belt A, constructed substantially as set forth.

E. AINSWORTH.

Witnesses:
JOSEPH ANDREWS,
CHAS. H. MOORE.